United States Patent
Suzuki et al.

(10) Patent No.: US 10,682,005 B2
(45) Date of Patent: Jun. 16, 2020

(54) BEVERAGE DISPENSER

(71) Applicant: SANDEN HOLDINGS CORPORATION, Isesaki-shi (JP)

(72) Inventors: Mitsuo Suzuki, Isesaki (JP); Taiichi Tsutsumi, Isesaki (JP)

(73) Assignee: SANDEN RETAILS SYSTEMS CORPORATION, Isesaki-shi (JP)

(\*) Notice: Subject to any disclaimer, the term of this patent is extended or adjusted under 35 U.S.C. 154(b) by 556 days.

(21) Appl. No.: 14/695,740

(22) Filed: Apr. 24, 2015

(65) Prior Publication Data

US 2015/0374164 A1    Dec. 31, 2015

(30) Foreign Application Priority Data

Jun. 25, 2014 (JP) .................... 2014-130800

(51) Int. Cl.
*A47J 31/56* (2006.01)
*A47J 31/24* (2006.01)
*A47J 31/40* (2006.01)

(52) U.S. Cl.
CPC .................. *A47J 31/408* (2013.01)

(58) Field of Classification Search
CPC .. A47J 31/24; A47J 31/32; A47J 31/52; A47J 31/34; A47J 31/36
USPC ............ 99/302 R, 285, 280, 289 T, 287, 292
See application file for complete search history.

(56) References Cited

U.S. PATENT DOCUMENTS

| | | | | |
|---|---|---|---|---|
| 3,565,641 A | * | 2/1971 | King | A47J 31/36 99/287 |
| 5,650,186 A | * | 7/1997 | Annoni | A47J 31/3609 222/129.4 |
| 5,865,096 A | * | 2/1999 | Kawabata | A47J 31/3652 99/283 |

(Continued)

FOREIGN PATENT DOCUMENTS

| | | |
|---|---|---|
| JP | 1-255996 | 10/1989 |
| JP | 2006-215694 | 8/2006 |

(Continued)

OTHER PUBLICATIONS

Machine translation of JP5388517 listed in IDS of May 24, 2016.*
(Continued)

*Primary Examiner* — Ibrahime A Abraham
*Assistant Examiner* — Justin C Dodson
(74) *Attorney, Agent, or Firm* — Cozen O'Connor

(57) ABSTRACT

A beverage dispenser, in which a filter is arranged between the lower end of a brewing chamber and the upper end of a fluid receptacle, and a beverage brewed by supplying a raw material and water to the chamber and filtered by the filter is received in the fluid receptacle, and is thereafter delivered to a cup along a beverage path. The beverage dispenser includes a pump arranged partway along the beverage path, and that reduces a pressure in the fluid receptacle to draw the beverage from the chamber, and delivers it to the cup. A predetermined quantity of the raw material and a first quantity of water are supplied to the chamber, and thereafter, during the delivering of beverage, a second quantity of water is supplied to the chamber, so that without interruption, the beverage is delivered to and served in the cup C.

1 Claim, 9 Drawing Sheets

(56) References Cited

U.S. PATENT DOCUMENTS

| | | | | |
|---|---|---|---|---|
| 8,180,204 B2* | 5/2012 | Glucksman | ........... | A47J 31/057 |
| | | | | 392/328 |
| 2009/0095165 A1* | 4/2009 | Nosler | ................. | A47J 31/007 |
| | | | | 99/289 R |
| 2013/0129885 A1* | 5/2013 | Doglioni Majer | .... | A47J 31/002 |
| | | | | 426/431 |

FOREIGN PATENT DOCUMENTS

| | | |
|---|---|---|
| JP | 2010-067211 | 3/2010 |
| JP | 2010-158455 | 7/2010 |
| JP | 52-18531 | 6/2013 |
| JP | 53-88517 | 1/2014 |

OTHER PUBLICATIONS

Office Action dated Sep. 20, 2016 which issued in the corresponding Korean Patent Application No. 10-2015-0058850.
Office Action dated Nov. 16, 2016 which issued in Korean Patent Application No. 10-2015-0058850.
Office Action dated Mar. 6, 2018 which issued in the corresponding Japanese Patent Application No. 2014-130800.

\* cited by examiner

BEVERAGE DISPENSER

CROSS-REFERENCE TO RELATED APPLICATION

Priority is claimed to Japanese Patent Application No. 2014-130800 filed on Jun. 25, 2014.

BACKGROUND OF THE INVENTION

1. Field of the Invention

The present invention relates to a beverage dispenser that brews beverage by employing a beverage raw material and water, and serves the beverage.

2. Description of Related Art

A generally known beverage dispenser is a beverage dispenser that employs, as a beverage raw material, ground coffee obtained by grinding coffee beans using a grinder, or tea leaves for green tea, etc., and that brews a beverage, such as coffee or tea, by supplying this material and water (hot water or cold water) to a brewing chamber, and delivers the obtained beverage into a cup to serve for a user. For the beverage dispenser of beverage brewing type, a fluid receptacle is generally arranged at the lower end of the brewing chamber through a filter, and the beverage brewed by the brewing chamber is filtered by the filter and is received in the fluid receptacle, and the thus produced beverage is delivered to a cup along a beverage path that is connected to the fluid receptacle.

In order to cope with diversified demands of users, this type of beverage dispenser has a configuration wherein large sized cups, for example, are prepared in addition to standard sized cups, and a large volume of a beverage (e.g., 300 ml) that is greater than the capacity for a standard sized cup (e.g., 150 ml) is provided in accordance with user's selection.

Since downsizing of the apparatus has been requested for this type of beverage dispenser, there is a case in which simple increase of the internal volume of a brewing chamber is not available for coping with brewing of a large volume of a beverage. There are some beverage dispensers of this type proposed by taking measures in order to serve a large volume of beverage without increasing the size of the brewing chamber, i.e., with maintaining a compact brewing chamber size.

A beverage dispenser disclosed in Japanese Patent Application Laid-Open Publication No. H 01-255996 is known as a beverage dispenser, for which measures to maintain a compact brewing chamber size have been taken. According to the configuration of the beverage dispenser disclosed in Japanese Patent Application Laid-Open Publication No. H 01-255996, the internal volume of the brewing chamber is determined in accordance with the quantity of a beverage served in a standard sized cup, and in a case in which a large sized cup is selected by a user, the brewing processing in the brewing chamber is performed by being divided into a first brewing process and a second brewing process, so that a compact brewing chamber size is maintained, while a large volume of a beverage can be served by performing the first and second brewing processes.

Specifically, in the first brewing process, the quantity of hot water that corresponds to the volume of a beverage to be served in a standard sized cup and the quantity of a raw material that corresponds to the volume of a beverage to be served in a large sized cup are supplied to the brewing chamber through an upper opening of the brewing chamber. Thereafter, the upper opening of the brewing chamber is closed by a valve mechanism and at the same time, the brewing chamber is pressurized by supplying air to the brewing chamber. Thus, the beverage in the brewing chamber is delivered to the cup. In the succeeding second brewing process, the valve mechanism is elevated and the quantity of hot water to compensate for insufficiency is supplied to the brewing chamber, in which the raw material supplied in the first brewing process is still present, and thereafter, the valve mechanism is lowered to close the upper opening of the brewing chamber, and at the same time, the brewing chamber is pressurized by supplying air to the brewing chamber. Therefore, the beverage in the brewing chamber is delivered to the cup to feed the remaining volume of the beverage to the cup.

However, for the beverage dispenser disclosed in Japanese Patent Application Laid-Open Publication No. H 01-255996, it is required that the upper opening of the brewing chamber be opened by elevating the valve mechanism to supply hot water to the brewing chamber. Whereas, to deliver to the cup the beverage that has been brewed in the brewing chamber, it is required that the upper opening of the brewing chamber be closed by lowering the valve mechanism in order to pressurize the brewing chamber. Therefore, in a case in which a large volume of a beverage is to be served, after the first brewing process has been performed, delivering of the beverage to the cup is interrupted in a period since the valve mechanism is elevated to supply the quantity of hot water to compensate for the insufficiency until the valve mechanism is lowered to start supply of air. When the brewing chamber is pressurized by supplying air to the brewing chamber, delivering of the beverage to the cup is restarted.

Therefore, according to the beverage dispenser disclosed in Japanese Patent Application Laid-Open Publication No. H 01-255996, a waiting period during which delivering of a beverage is not performed is present between delivering of the beverage in the first brewing process and delivering of the beverage in the second brewing process, and accordingly, a period required for serving the beverage (the total period required until serving of a large volume of the beverage is completed) is extended by a length equivalent to the waiting period. Furthermore, since delivering of the beverage is paused, a user might mistakenly think that serving of a large volume of the beverage is completed, and pull the cup out before supplying of the beverage is completed, and therefore, there is a possibility that a large volume of the beverage cannot be appropriately served.

While taking the above described circumstances into account, one object of the present invention is to provide a beverage dispenser that can appropriately serve a large volume of a beverage in a short period of time, while maintaining a compact brewing chamber size.

SUMMARY OF THE INVENTION

To achieve the above object, a beverage dispenser according to one aspect of the present invention, in which a filter is arranged between a lower end of a cylindrical brewing chamber and an upper end of a fluid receptacle, and a beverage that has been brewed by supplying a raw material and water to the brewing chamber and has been filtered by the filter is received in the fluid receptacle, and is thereafter delivered to a cup along a beverage path, includes:

a pump arranged partway along the beverage path, and that reduces a pressure in the fluid receptacle to draw the beverage from the brewing chamber by suction, and delivers the beverage to the cup, wherein a predetermined quantity of the raw material and a first quantity of water are supplied to the brewing chamber, and thereafter, during delivering of the beverage by the pump, a second quantity of water is supplied to the brewing chamber, so that without interruption, the volume of the beverage that corresponds to a capacity of the cup is delivered to and served in the cup.

Other objects and features of aspects of the present invention will be understood from the following description with reference to the accompanying drawings.

DESCRIPTION OF PREFERRED EMBODIMENT

One embodiment of the present invention will now be described with reference to the accompanying drawings.

Figure 1:
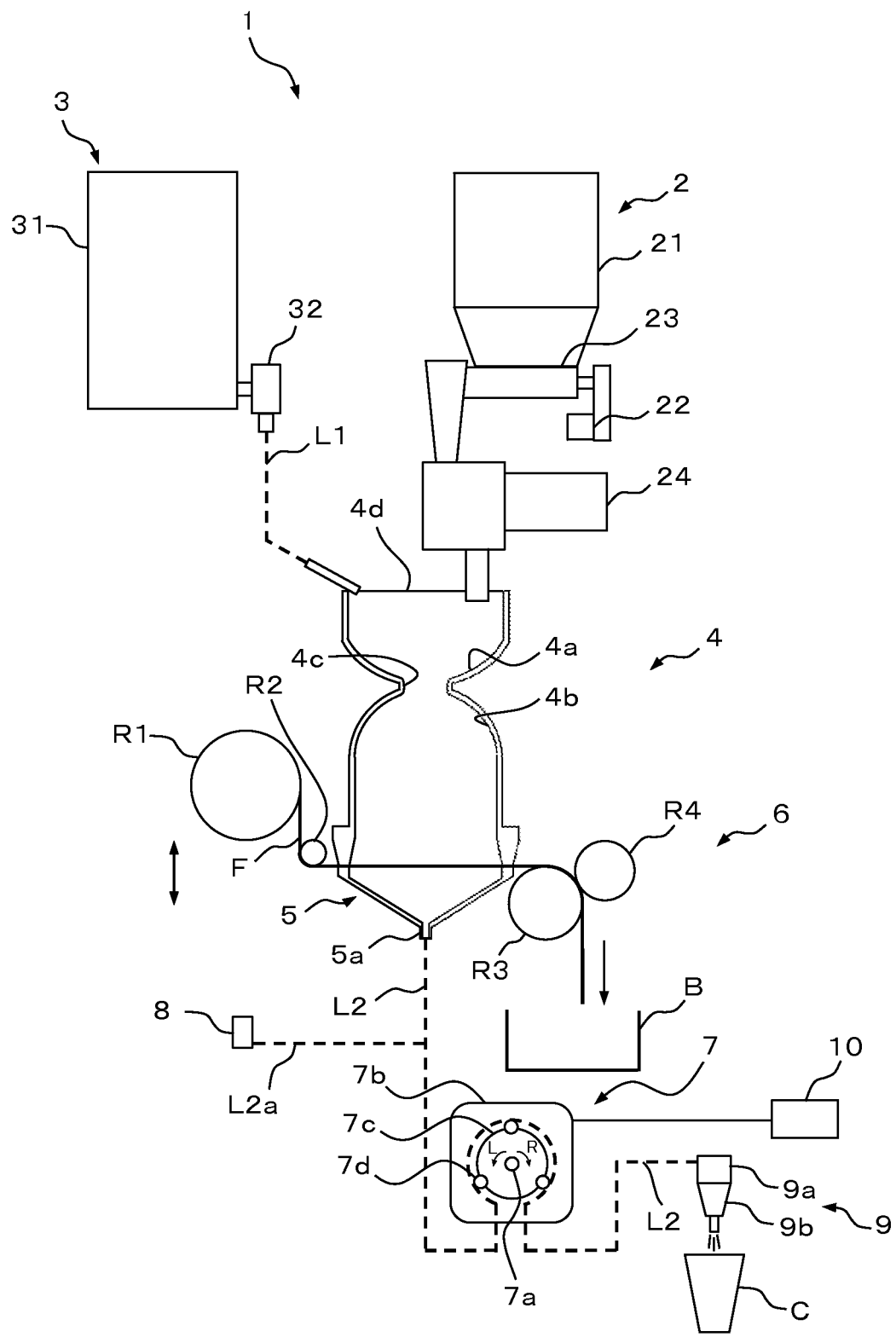
FIG. 1 is a schematic configuration diagram of a beverage dispenser according to one embodiment of the present invention.
Figure 2:
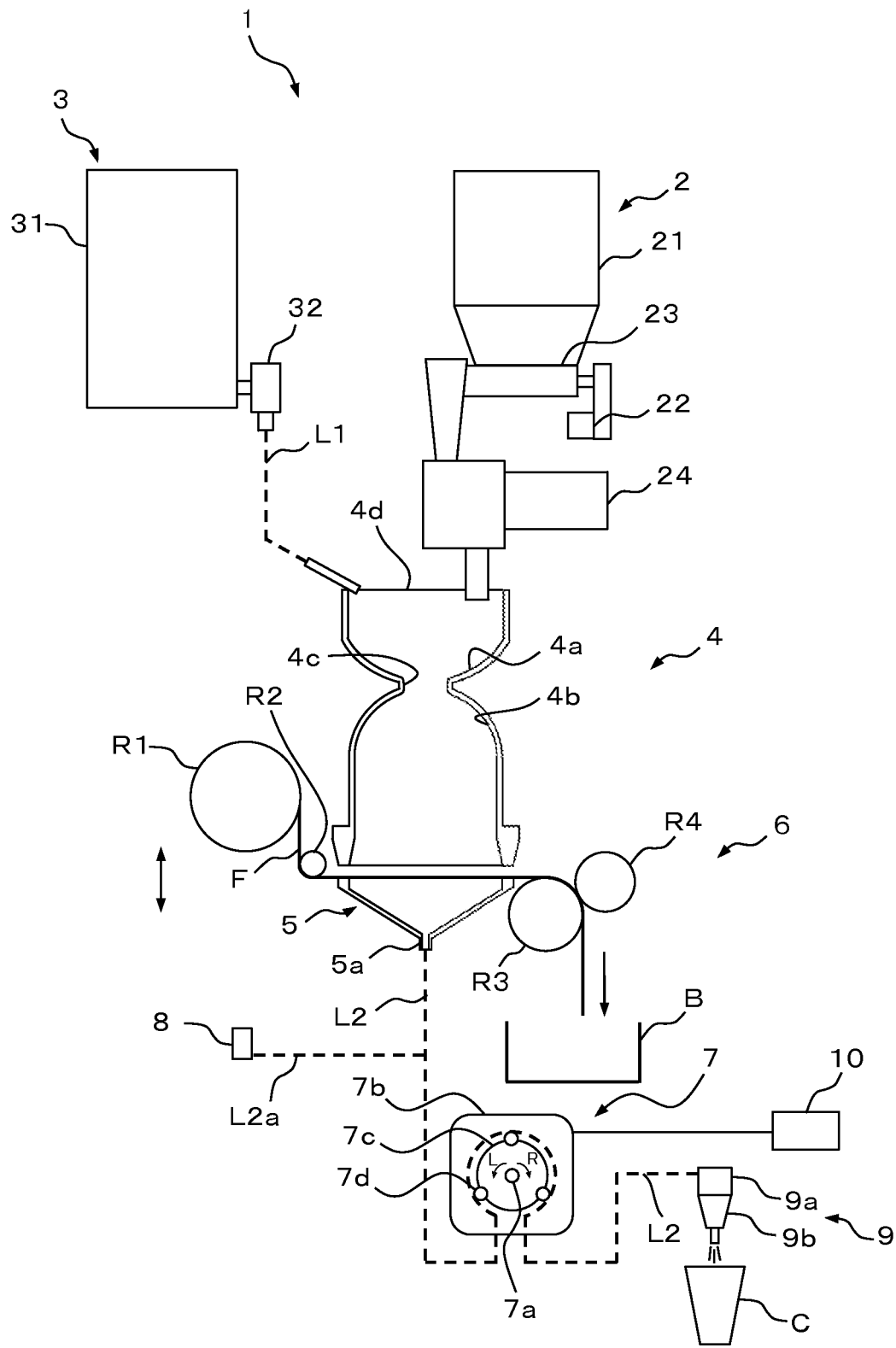
FIG. 2 is a schematic configuration diagram for explaining the state of the beverage dispenser during conveying of a filter according to the embodiment.

FIG. 1 is a schematic configuration diagram of a beverage dispenser 1 according to the embodiment of the present invention, and FIG. 2 is a schematic configuration diagram for explaining the state of the beverage dispenser 1 during conveying of a filter F that will be described later.

The beverage dispenser 1 will now be described for a case in which the beverage dispenser 1 is employed by, for example, being incorporated in a cup-serving coffee server that employs, as a raw material, ground coffee obtained by grinding coffee beans using a grinder 24, which will be described later, and that brews regular coffee using the raw material, and pours the obtained coffee liquid (regular coffee) into a cup C to serve for a user.

The beverage dispenser 1 includes: a raw material supply unit 2 for supplying a raw material of a beverage; a hot water supply unit 3 for supplying hot water; a cylindrical brewing chamber 4 to which the raw material and hot water are to be supplied; a fluid receptacle 5 arranged below the brewing chamber 4 through a filter F; a filter conveying mechanism 6 for the filter F; a pump 7; a pressure sensor 8 for measuring the pressure in the fluid receptacle 5; a buffer unit 9; and a controller 10 for controlling the operation of the entire apparatus.

The raw material supply unit 2 includes a canister 21 in which coffee beans are stored, and the canister 21 is provided with a feeding mechanism 23 that is driven by a raw material motor 22 to feed a predetermined quantity of coffee beans. The grinder 24 for grinding coffee beans to produce ground coffee is located below the canister 21. With this arrangement, the raw material supply unit 2 supplies the powdered ground coffee as a raw material to the brewing chamber 4.

The hot water supply unit 3 includes a tank 31 used to heat hot water at a predetermined temperature and keep the hot water, and a hot water supply path L1 is connected to the tank 31 through a hot water solenoid valve 32. When the hot water solenoid valve 32 is opened, hot water in the tank 31 is supplied along the hot water supply path L1 to the brewing chamber 4.

The brewing chamber 4 is a container, to which the ground coffee and hot water are supplied to brew a coffee liquid, and is formed in a cylindrical shape. The internal volume of the brewing chamber 4 is defined in accordance with the volume of the coffee liquid to be served in the standard sized cup C. Specifically, the internal volume of the brewing chamber 4 is set so as to include a predetermined margin. Therefore, even when a first quantity (e.g., 150 ml) of hot water, required for a case in which a coffee liquid is to be served in a standard sized cup C, and a predetermined quantity (e.g., 20 g) of ground coffee, required for a case in which a coffee liquid is to be served in a large sized cup C, are supplied to the brewing chamber 4, the obtained fluid mixture will not overflow from the brewing chamber 4.

Specifically, the brewing chamber 4 has, for example, a substantially cylindrical shape, and a semi-spherical receiving chamber 4a that is open upward is formed as the upper half of the brewing chamber 4, while a semi-spherical mixing chamber 4b that is open downward is formed as the lower half. The receiving chamber 4a and the mixing chamber 4b communicate with each other through a communication portion 4c whose diameter is less than the diameter of the opening of the upper or lower face. The upper face of the receiving chamber 4a is open, and the ground coffee and hot water can be supplied to the receiving chamber 4a through an upper opening 4d.

The filter F is held by being sandwiched between the lower end of the brewing chamber 4 and the upper end of the fluid receptacle 5, and is made of, for example, belt-like paper or synthetic fiber.

The fluid receptacle 5 is a container used to receive the coffee liquid, which has been brewed by supplying the ground coffee and hot water to the brewing chamber 4, and has been filtered by the filter F. The fluid receptacle 5 can be moved by a fluid receptacle moving mechanism (not shown), together with the filter conveying mechanism 6, in the vertical direction indicated by a double-headed arrow illustrated in FIG. 1 and FIG. 2. The lower end of the brewing chamber 4 is pressed against the upper end of the fluid receptacle 5 through the filter F.

The fluid receptacle 5 is, for example, funnel-shaped, and the upper opening is formed in a shape corresponding to the lower opening of the brewing chamber 4, and a pipe 5a of a small diameter is formed at the lower portion of the fluid receptacle 5. A filter support portion (not shown), such as a metal mesh, is arranged on the upper face of the fluid receptacle 5, and supports the filter F and allows passage of the coffee liquid. A beverage path L2 is connected to the pipe 5a of the fluid receptacle 5 to introduce the coffee liquid into the cup C, and the pump 7 is connected partway along the beverage path L2. The beverage path L2 is formed by employing a flexible tube, such as a silicone tube.

As described above, for the beverage dispenser 1 in this embodiment, the filter F is arranged between the lower end of the cylindrical brewing chamber 4 and the upper end of the fluid receptacle 5, and the coffee liquid that has been brewed by supplying the ground coffee and hot water to the brewing chamber 4 and has been filtered by the filter F is received in the fluid receptacle 5, and thereafter, is delivered to the cup C along the beverage path L2.

The filter conveying mechanism 6 is a device that includes various types of rollers (R1 to R4), and conveys the belt-like filter F in the longitudinal direction. Specifically, the roller R1 around which unused filter F is wound and a guide roller R2 that pulls the filter F from the roller R1 and guides the filter F, are arranged on one side of the fluid receptacle 5. The filter F guided by the guide roller R2 is inserted between the brewing chamber 4 and the fluid receptacle 5. Furthermore, the conveying roller R3 that rotates in the filter conveying direction (a clockwise direction in FIG. 1 and FIG. 2) to convey the filter F and the press roller R4 that presses the filter F against the roller R3, are arranged on the other side of the fluid receptacle 5. A collection box B is located below the conveying roller R3 to collect, for example, the used portion of the filter F conveyed by the conveying roller R3. Conveying of the filter F by the conveying roller R3 is performed after the fluid receptacle 5 has been moved downward by the fluid receptacle moving mechanism (not shown), as illustrated in FIG. 2.

The pump 7 is arranged partway along the beverage path L2, and draws in a coffee liquid from the brewing chamber 4 by reducing the pressure in the fluid receptacle 5, and delivers the coffee liquid to the cup C.

In this embodiment, the pump 7 is, specifically, a tube pump that can be operated by selectively switching between a suction delivering operation, in which the coffee liquid is drawn from the brewing chamber 4 by suction, and is delivered to the cup C, and a mixing operation, in which air is supplied to the fluid receptacle 5 and is introduced into the brewing chamber 4 through the filter F to cause the mixing action of the ground coffee and the hot water.

More specifically, the pump 7 that is a tube pump includes a ring-like pump casing 7b, through which a pump shaft 7a passes the center. A rotary disc 7c fitted over the pump shaft 7a is rotatably arranged in the pump casing 7b, and a tube (one part of the beverage path L2) is inserted between the inner wall of the pump casing 7b and the rotary disc 7c. On the outer circumference of the rotary disc 7c, an appropriate number (e.g., three) of tube rollers 7d for pressing down the tube are arranged at appropriate locations at the same intervals in the circumferential direction. The pump 7 provides a pump function, whereby, during rotation of the rotary disc 7c, the tube rollers 7d press down the tube to block the inside of the tube, and change the blockage positions in the longitudinal direction of the tube, so that the coffee liquid or the air enclosed in the tube between the two adjacent tube rollers 7d is forced out.

The mixing operation and the suction delivering operation performed by the pump 7, described above, will be described later in detail.

The pressure sensor 8 is a sensor that measures a pressure in the fluid receptacle 5, and is connected to, for example, a branch path L2a that is a branch of the beverage path L2 extended from the fluid receptacle 5 to the pump 7. The pressure sensor 8 outputs a measurement signal indicating the obtained value of measured pressure P. This measurement signal is transmitted to the controller 10 at a predetermined sampling time interval, and is employed to perform the control for halting the pump 7.

To promptly detect pressure fluctuations, the sampling time interval should be shortened as much as possible. However, since an abnormal value might be included due to noise suddenly generated by an external apparatus, such as a motor, there is a possibility that, when using raw data of the measurement signal that might include the abnormal value, the controller 10 cannot appropriately halt the pump 7. Therefore, in this embodiment, a filtering process, such as calculation of a moving average, is performed for the raw data for the measurement signal, and the resultant measurement signal obtained by the filtering process is transmitted to the controller 10 as a measurement signal for the measured pressure obtained by the pressure sensor 8. As a result, the tendency for increasing or reducing the measured pressure P is more easily obtained, and external noise is removed.

The buffer unit 9 is connected to the downstream end (the cup C side end) of the beverage path L2 to accept the coffee liquid, and the coffee liquid received in the buffer unit 9 is delivered to the cup C at the end. The buffer unit 9 is formed like a cylinder that opens upward and downward, and includes an upper large-diameter portion 9a and a lower small-diameter portion 9b, which is formed like a funnel. An inlet is formed on the side of the large-diameter portion 9a in the tangential direction, and the end of the tube (L2) is connected to the inlet.

The controller 10 controls the operation of the entire apparatus, and specifically, controls driving of the raw material motor 22, a drive motor (not shown) for the grinder 24, the hot water solenoid valve 32, a drive motor (not shown) for the conveying roller R3, a pump motor (not shown) for the pump 7, and the fluid receptacle moving mechanism (not shown). The controller 10 receives a measurement signal from the pressure sensor 8. Furthermore, although not shown, a selection switch is provided on the front face of the main body of the apparatus to allow a user to select the size of the cup C. The controller 10 receives, from the selection switch, a signal to identify the cup size.

According to the arrangement of the beverage dispenser 1 of this embodiment, in a case in which a user, etc., selects a large sized cup C, a predetermined quantity of ground coffee and a first quantity of hot water are supplied to the brewing chamber 4, and during delivering of the coffee liquid by the pump 7, a second quantity of hot water is supplied to the brewing chamber 4, so that without interruption, the volume of the beverage that corresponds to the capacity of the cup is delivered to and served in the cup C.

In this embodiment, the first quantity is set to a quantity (e.g., 150 ml) required for a case in which the coffee liquid is to be served in the standard sized cup C, and the second quantity is set to a quantity (e.g., 150 ml) to compensate for the insufficiency, obtained by subtracting the first quantity from a quantity (e.g., 300 ml) required for a case in which the coffee liquid is to be served in a large sized cup C.

Specifically, a period of time required from driving of the raw material motor 22 and the grinder 24 until supplying of a predetermined quantity of ground coffee, which is necessary for a case in which the volume of coffee liquid that corresponds to each cup size is provided (e.g., 10 g of ground coffee in case of a standard sized cup or 20 g of ground coffee in case of a large sized cup), is set in advance to the controller 10. Furthermore, a period of time required from opening of the hot water solenoid valve 32 until supplying of the first quantity of hot water and a period of time required for supplying the second quantity of hot water are also set in advance to the controller 10.

The operation of the beverage dispenser 1 according to this embodiment will now be described with reference to the drawings. It should be noted that a user, etc., can select one of the two sizes for the cup C, a standard (regular) size or a big (large) size, and the operations will be described below, respectively, for a case in which the standard sized cup C is selected by the user, etc., and for a case in which the large-sized cup C is selected.

First, the operation performed in a case in which a coffee liquid is to be served in the standard-sized cup C will be described with reference to FIG. 3.

In the standby state, the fluid receptacle 5 is located at a lower position, separated from the brewing chamber 4, as illustrated in FIG. 2. At this time, when a user, etc., selects the standard sized cup C by using a selection switch (not shown), an identification signal indicating that the standard sized cup C has been selected is transmitted from the selection switch to the controller 10. Upon receiving the identification signal, the controller 10 generates an operation start signal, and first, outputs the operation start signal to the fluid receptacle moving mechanism to move the fluid receptacle 5 to the upper position, providing the state in which the filter F is securely held by being sandwiched between the fluid receptacle 5 and the brewing chamber 4. Following this, the controller 10 outputs the operation start signal to the hot water solenoid valve 32, the raw material motor 22 and the grinder 24.

Figure 3:
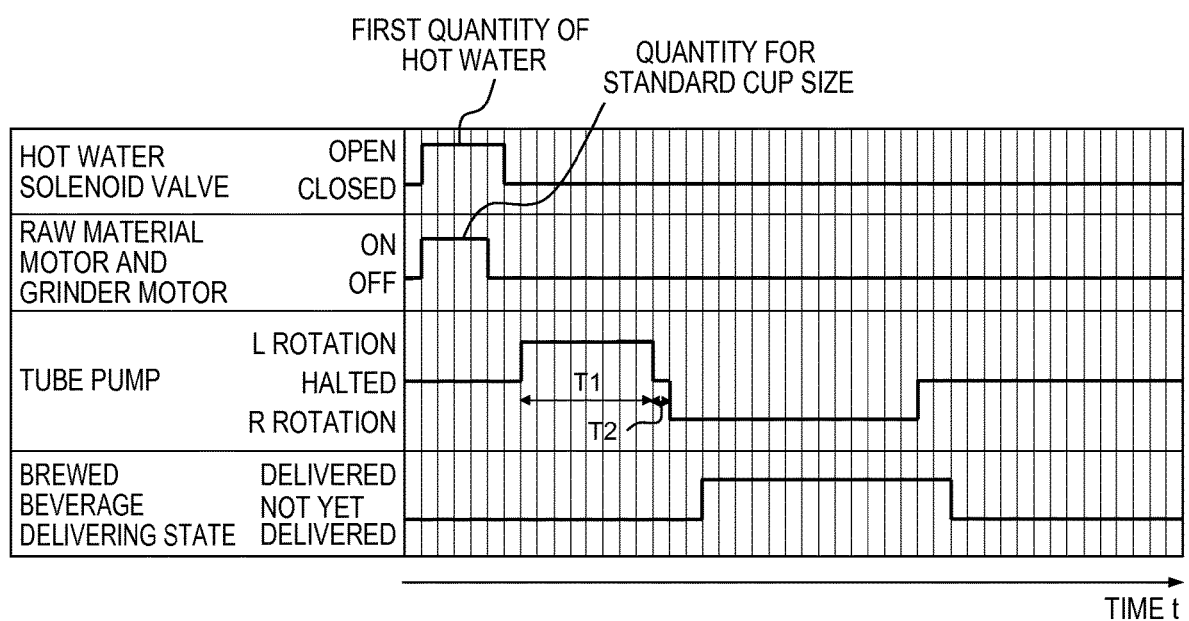
FIG. 3 is a timing chart of the beverage brewing operation performed by the beverage dispenser according to the embodiment in a case in which a beverage is to be served in a standard (regular) sized cup.

As illustrated in FIG. 3, based on the operation start signal issued by the controller 10, the hot water solenoid valve 32 is opened, and also, the raw material motor 22 and the drive motor for the grinder 24 are activated (ON). Thus, hot water in the tank 31 is introduced into the brewing chamber 4, and at the same time, coffee beans in the canister 21 are supplied to, and ground by the grinder 24, and the obtained ground coffee is supplied to the brewing chamber 4. Thereafter, the ground coffee and the hot water are mixed in the brewing chamber 4 above the filter F. In this case, when the controller 10 has output the operation start signal to the raw material motor 22 and the drive motor for the grinder 24, and, for example, a preset time period required for supplying 10 g of the ground coffee has elapsed, the controller 10 stops the raw material motor 22 and the drive motor for the grinder 24 (OFF). As a result, a proper quantity of ground coffee is supplied to the brewing chamber 4. Whereas, when a preset time period required for supplying the first quantity of hot water (corresponding to the capacity of the standard sized cup) has elapsed since the hot water solenoid valve 32 was open, the controller 10 closes the hot water solenoid valve 32.

Furthermore, when a predetermined period of time has elapsed since the hot water solenoid valve 32 was closed, the controller 10 drives the pump motor of the pump 7 to rotate the pump shaft 7a in a direction indicated by an arrow L in FIG. 1, and starts the mixing operation.

Specifically, when the pump shaft 7a is rotated in the direction L, the pump 7 pressurizes the fluid receptacle 5 by drawing air through the downstream opening of the beverage path L2 by suction, and introduces the pressurized air from the fluid receptacle 5 through the filter F to the brewing chamber 4 to cause mixing of the ground coffee with the hot water in the brewing chamber 4. Since the pressurized air passes the filter F and rises as air bubbles in the fluid mixture in the brewing chamber 4, and the air bubbles promote mixing of the coffee ground and hot water, brewing of the coffee liquid can be performed in a short period of time. The controller 10 permits the pump 7 to continue the mixing operation (rotation in the direction L) during a preset time period T1, and when the time period T1 has elapsed, stops the pump 7 to halt the mixing operation.

Furthermore, when a preset time period T2, for example, has elapsed since the mixing operation of the pump 7 was halted, the controller 10 permits the pump 7 to start the suction delivering operation for a coffee liquid. Specifically, when the pump shaft 7a is rotated in a direction indicated by an arrow R in FIG. 1, the pump 7 reduces the pressure in the fluid receptacle 5 by drawing air from the fluid receptacle 5 by suction. As a result, the pressure in the fluid receptacle 5 becomes lower than the atmospheric pressure, and of the fluid mixture in the brewing chamber 4, the coffee grounds are captured by the filter F, and only the coffee liquid is filtered by the filter F and is forced to drip into the fluid receptacle 5. The coffee liquid that has dripped into the fluid receptacle 5 is introduced into the pump 7 by suction, and is forcibly fed to the buffer unit 9 by the pump 7. The coffee liquid thus fed to the buffer unit 9 is delivered from the buffer unit 9 and is poured into the cup C. As illustrated in FIG. 3, there is actually a time lag between the start of the rotation of the pump 7 in the direction R and the delivering of the coffee liquid into the cup C. Furthermore, based on the value of a measurement signal received from the pressure sensor 8, for example, the controller 10 halts the pump 7, and completes serving of the coffee liquid in the standard sized cup C. Thereafter, the controller 10 employs the fluid receptacle moving mechanism to move the fluid receptacle 5 to the lower position. As a result, the beverage dispenser 1 is set to the standby state.

The control for halting the pump 7 is executed in the same manner as performed for a case in which a coffee liquid is to be served in a large sized cup, and will be described later in detail.

The operation performed for a case in which a coffee liquid is to be served in a large sized cup C will be described with reference to FIG. 4 to FIG. 7. The same operation as the feeding operation for a standard sized cup C will be only briefly described.

Figure 4:
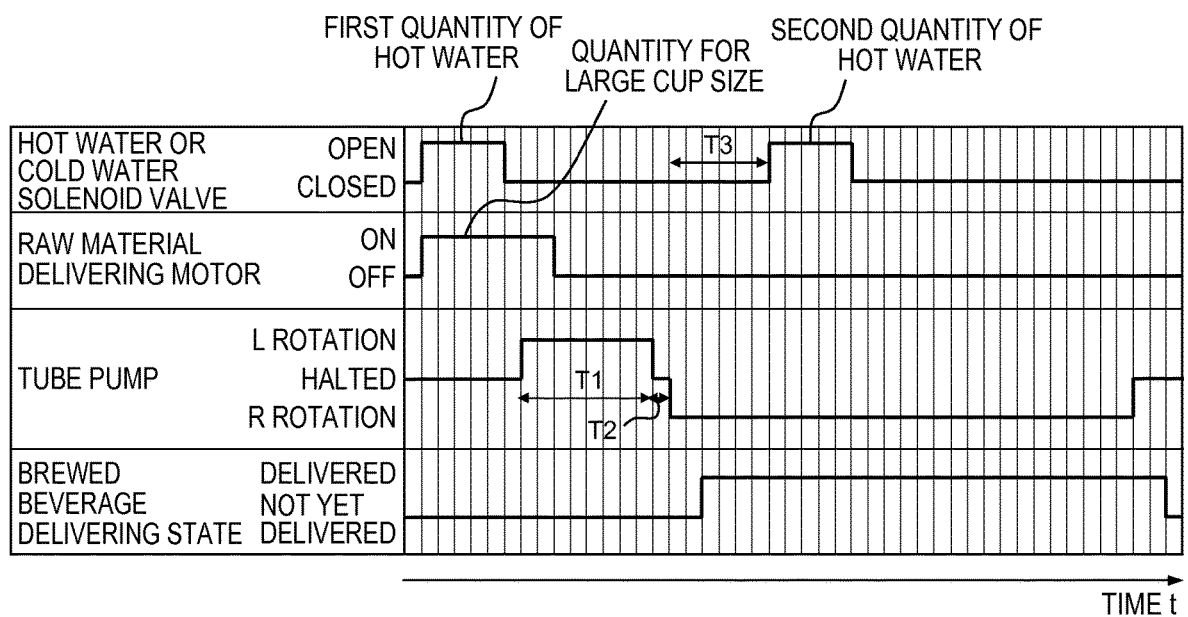
FIG. 4 is a timing chart of the beverage brewing operation performed by the beverage dispenser according to the embodiment in a case in which a beverage is to be served in a big (large) sized cup.

When the controller 10 receives an identification signal indicating a large sized cup C has been selected, the controller 10 outputs an operation start signal to the fluid receptacle moving mechanism to move the fluid receptacle 5 to the upper position, and provides the state in which the filter F is securely held by being sandwiched between the fluid receptacle 5 and the brewing chamber 4. Thereafter, the controller 10 outputs the operation start signal to the hot water solenoid valve 32, the raw material motor 22 and the grinder 24. Thus, as illustrated in FIG. 4, the hot water solenoid valve 32 is opened, and also, the raw material motor 22 and the drive motor for the grinder 24 are activated (ON). Furthermore, when the controller 10 has output the operation start signal to the raw material motor 22 and the drive motor for the grinder 24, and a preset time period required for supplying, for example, 20 g of the ground coffee has elapsed, the controller 10 stops the raw material motor 22 and the drive motor for the grinder 24 (OFF). As a result, a proper quantity of ground coffee is supplied to the brewing chamber 4 at once. Whereas, when a preset time period required for supplying, for example, 150 ml (the first quantity) of hot water has elapsed since the hot water solenoid valve 32 was open, the controller 10 closes the hot water solenoid valve 32.

When a predetermined period of time has elapsed since the hot water solenoid valve 32 was closed, the controller 10 starts the mixing operation of the pump 7 (rotation in the direction L), and continues the mixing operation (rotation in the direction L) during the preset time period T1. When the time period T1 has elapsed, the pump 7 is halted.

Furthermore, when a preset time period T2 has elapsed since the mixing operation was halted, the controller 10 permits the pump 7 to start the suction delivering operation for a coffee liquid (rotation in the direction R) and to begin delivering of the coffee liquid to the cup C.

Moreover, when a predetermined time period T3 has elapsed, as illustrated in FIG. 4, since the pump 7 started the suction delivering operation for the coffee liquid (rotation in the direction R), the controller 10 begins to supply, to the brewing chamber 4, 150 ml (the second quantity) of hot water, i.e., the quantity of hot water to compensate for insufficiency.

Figure 5:
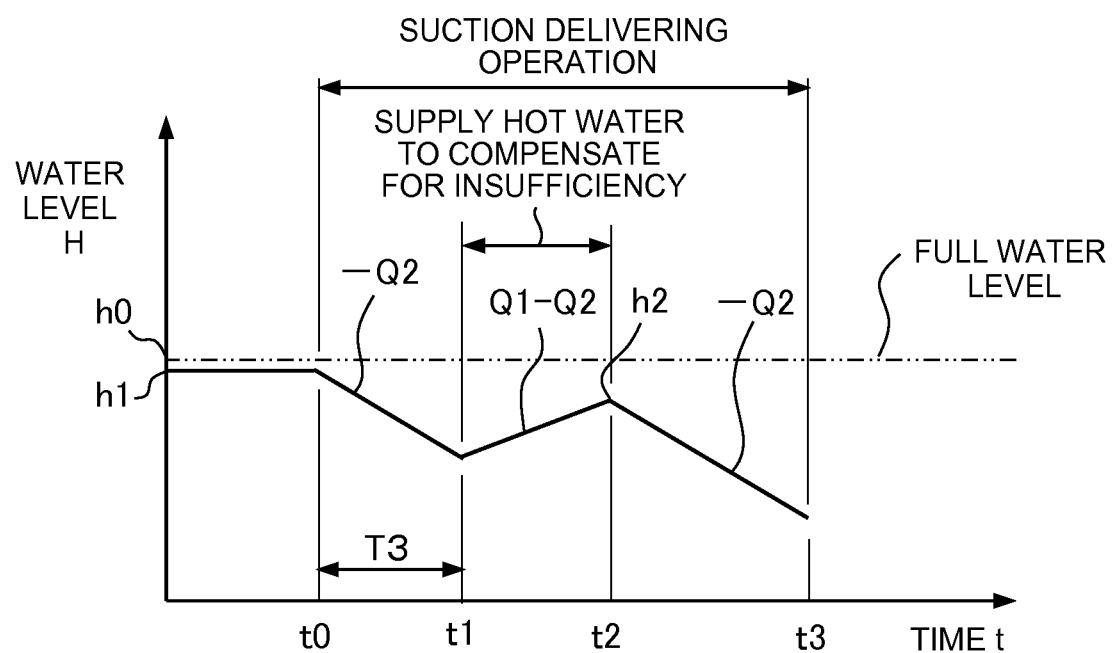
FIG. 5 is a conceptual diagram for explaining the change of a water level in the brewing chamber of the beverage dispenser according to the embodiment.

FIG. 5 is a conceptual diagram for explaining the change of a water level H of a fluid mixture (a raw material and hot water) in the brewing chamber 4 after the pump 7 has started the suction delivering operation, where the horizontal axis represents time t, while the vertical axis represents the water level H of the fluid mixture in the brewing chamber 4. In FIG. 5, h0 indicates the position of the full water level (two-dot chain line in FIG. 5) in the brewing chamber 4. h1 indicates the water level in a case in which the first quantity of hot water and a predetermined quantity of ground coffee required to provide the quantity of a coffee liquid for a large sized cup are supplied to the brewing chamber 4, and the water level h1 is set lower than h0 by a predetermined margin to prevent overflowing of a fluid mixture of hot water and the coffee raw material. Furthermore, t0 represents the start time of the suction delivering operation of the pump 7, t1 represents the start time of supply of the second quantity of hot water, t2 represents the time of completion of the supply of the second quantity of hot water, and t3 represents the time of halting (completion) of the suction delivering operation of the pump 7.

Generally, since the flow rate for the negative-pressure suction type to draw a beverage by suction is low, a flow rate Q1 (ml/sec) for supplying hot water is higher than a flow rate Q2 (ml/sec) for drawing the coffee liquid by the pump 7 by suction. Therefore, when supplying of hot water and drawing of the coffee liquid by suction are performed at the same time, the water level H of the fluid mixture rises in accordance with a difference between Q1 and Q2. Therefore, when the supply of hot water is started immediately after the suction delivering operation has begun (=t0), the fluid mixture will overflow the brewing chamber 4.

In this embodiment, in order to reliably prevent such leakage of the fluid mixture, the predetermined time period T3 used for determining a timing to start the supply of hot water to compensate for the insufficient quantity is set based on the flow rate Q1 for supplying hot water from the hot water supply unit 3 and the flow rate Q2 for drawing the coffee liquid by the pump 7 by suction.

Specifically, as illustrated in FIG. 5, when drawing the coffee liquid from the brewing chamber 4 by suction is started at time t0 with the suction flow rate Q2 in the state of the water level h1, the water level H is gradually lowered, and when supplying of the second quantity of hot water to the brewing chamber 4 is started at time t1 with the supply flow rate Q1, the water level H begins to rise, and supplying of the second quantity of hot water is completed at time t2. The controller 10 divides, for example, the second quantity by a difference value between the flow rates Q1 and Q2 to calculate a time period (t2-t1), which is required for supplying the second quantity of hot water, and when the obtained time period has elapsed since the hot water solenoid valve 32 was opened, the controller 10 closes the hot water solenoid valve 32 to appropriately supply the second quantity of hot water. In this arrangement, supplying of the second quantity of hot water is to be started at time t1, which is later than the start time t0 of the suction delivering operation of the pump 7 by a length equivalent to the predetermined time period T3, so that a water level h2 at which the supply of the second quantity of hot water is completed will be positioned at a level that does not exceed the full water level h0 (e.g., at a level 80% of the full water level h0). The predetermined time period T3 is set to, for example, three seconds based on the Q1 and Q2, and is set in advance to the controller 10. The operation for opening or closing the hot water solenoid valve 32 is controlled by the controller 10 to properly supply the second quantity of hot water.

Furthermore, based on the value of the measurement signal from the pressure sensor 8, the controller 10 identifies that the fluid mixture is exhausted in the brewing chamber 4, and halts the pump 7 (at time t3) to complete serving of the coffee liquid in the standard sized cup C. As a result, the suction delivering operation for the coffee liquid started by the pump 7 at time t0 is halted at the time t3.

Specifically, the pressure in the fluid receptacle 5 tends to be reduced by the suction delivering operation of the pump 7, but when the fluid mixture is exhausted in the brewing chamber 4, the air is drawn by suction from the brewing chamber 4 through the filter F to the fluid receptacle 5, and therefore, the suction load resistance is decreased, and the pressure in the fluid receptacle 5 tends to be increased close to the atmospheric pressure. The controller 10 employs the pressure sensor 8 to obtain a timing at which the pressure fluctuation tendency is changed to the tendency to increase, detects that there is no more fluid mixture left in the brewing chamber 4, and halts the pump 7. Thereafter, the controller 10 employs the fluid receptacle moving mechanism to move the fluid receptacle 5 to the lower position. Through this standby operation, the beverage dispenser 1 is set to the standby state.

Figure 6:
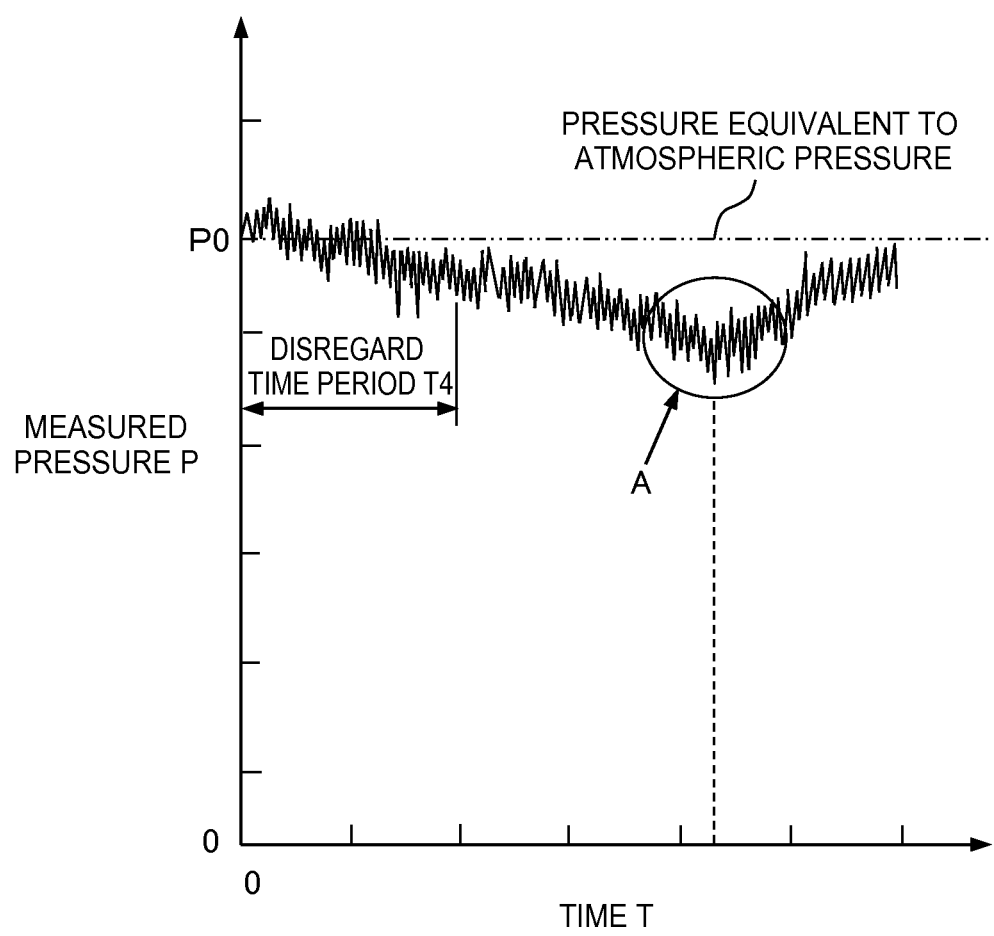
FIG. 6 is a diagram illustrating an example of fluctuations of pressure in the fluid receptacle of the beverage dispenser according to the embodiment.
Figure 7:
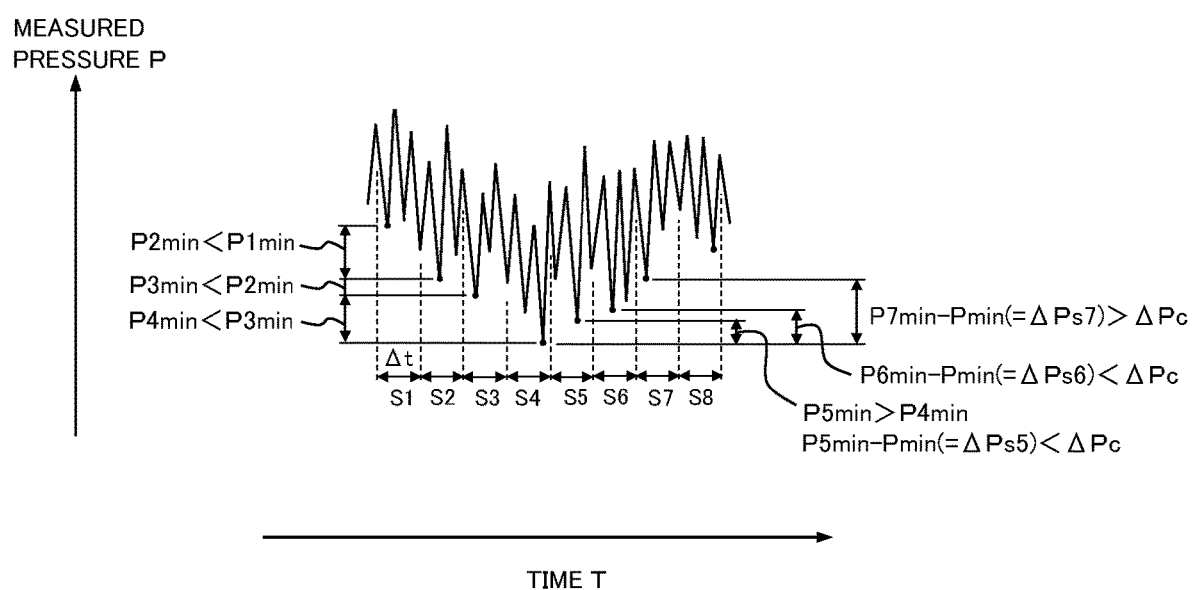
FIG. 7 is an enlarged diagram of a portion A in FIG. 6, for explaining a timing to halt a tube pump.

FIG. 6 is a diagram illustrating an example of fluctuations of the pressure P in the fluid receptacle 5 measured by the pressure sensor 8, while time t0 in FIG. 5 is employed as a start pint of the time T. FIG. 7 is an enlarge diagram for a portion A in FIG. 6.

Figure 9:
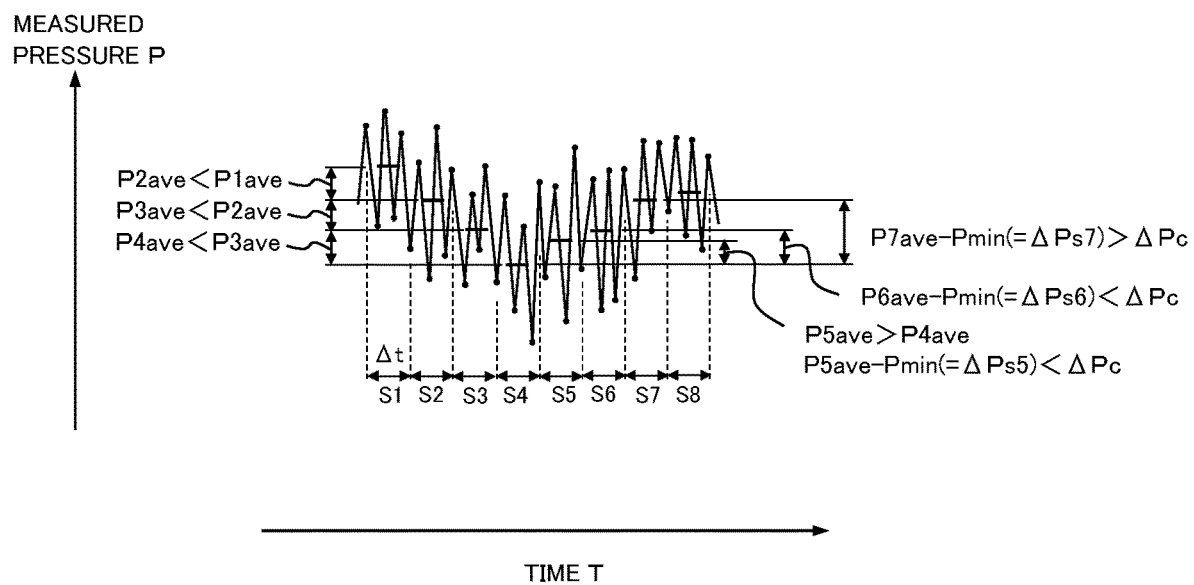
FIG. 9 is another enlarged diagram of the portion A in FIG. 6, for explaining a timing to halt the tube pump.

In this embodiment, as described above, the filtering process, such as calculation of a moving average, is performed for raw data of a measurement signal indicating the measured pressure P, and the measurement signal obtained by the filtering process is transmitted to the controller 10 as a measurement signal for the measured pressure P transmitted by the pressure sensor 8. Specifically, each measured pressure P value in FIG. 7, which represents the peak or the trough of the measured pressure P, is the average value (mean) of raw data used for the sampling and an appropriate number of sets of the preceding raw data. Therefore, the tendency of increasing or reducing the measured pressure can be more easily identified, and external noise can be removed. The fluctuations of measured pressure obtained by the filtering process are illustrated in FIG. 6, FIG. 7 and FIG. 9, described later, and the measured pressure before the filtering process is performed fluctuates more greatly than that indicated in these diagrams.

When a tube pump is employed as the pump 7 in this embodiment, as illustrated in FIG. 6 and FIG. 7, rapid pulsation is exhibited for the pressure in the fluid receptacle 5. Furthermore, generally, the pressure in the fluid receptacle 5 is reduced by the suction delivering operation, but there is a case, as illustrated in FIG. 6, in which, immediately after the suction delivering operation has started, an unstable pressure period is present in which, for example, the pressure in the fluid receptacle 5 goes beyond the atmospheric pressure P0. Therefore, there is a case in which halting of the pump 7 at an appropriate timing is difficult merely by providing a threshold value for pressure and by comparing the measured pressure P with the threshold value.

Therefore, as illustrated in FIG. 7, the controller 10 in this embodiment sequentially determines, for individual intervals of a preset time length Δt (S1 to S8 in a range illustrated in FIG. 7), the interval average (the interval representative value) for the measured pressure P obtained by the pressure sensor 8, and in a case in which the interval average for an interval Sn at a predetermined position is greater than the interval average for a preceding interval Sn-1 that is positioned before the interval Sn (earlier in time) and adjacent to the interval Sn, the controller 10 regards the interval average for the preceding interval Sn-1 as the minimum interval average Pmin, and halts the pump 7 when the interval averages for a predetermined number of intervals (including the interval Sn) that follow the preceding interval Sn-1 are greater than a value obtained by adding a preset threshold value ΔPc to the minimum interval average Pmin. That is, when values obtained by subtracting the minimum interval average Pmin from individual interval averages for a predetermined number of intervals (including the interval Sn) are greater than the threshold value ΔPc, the controller 10 halts the pump 7.

Furthermore, as illustrated in FIG. 6, when a preset time period T4 has elapsed since the pump 7 started the suction delivering operation for a coffee liquid, the controller 10 starts the control for halting the pump 7. As described above, after the suction delivering operation of the pump 7 has started, a disregard time period is provided, during which measurement signals transmitted by the pressure sensor 8 are disregarded, and during this period, the pump 7 is forced to be driven.

Specifically, the interval average is the minimum value of a plurality of values for the measured pressure P obtained in this interval by the filtering process. When the range in FIG. 7 after the elapse of the time period T4 is employed as an example for the explanation, a plurality of values for the measured pressure P obtained by the filtering process are entered for the individual intervals S1 to S8 at a predetermined sampling time interval, and the minimum values for these intervals are P1min to P8min, respectively. The controller 10 detects that, for example, the minimum value P2min for the interval S2, which follows the interval S1 and is adjacent to the interval S1, is less than the minimum value P1min for the interval S1, and sequentially detects that the minimum value P3min for the interval S3 is less than the minimum value P2min for the interval S2, and that the minimum value P4min for the interval S4 is less than the minimum value P3min for the interval S3. Furthermore, the controller 10 detects that the minimum value P5min for the interval S5 is greater than the minimum value P4min for the interval S4. In this case, the controller 10 stores the minimum value P4min as the minimum interval average Pmin for all of the intervals, and determines that, at the timing of determining the minimum interval average Pmin, the fluctuation tendency of the pressure in the fluid receptacle 5 has changed from the tendency to reduce to the tendency to increase.

Thereafter, the controller 10 detects that a value ΔPs5 obtained by subtracting the minimum interval average Pmin (=P4min) from the minimum value P5min for the interval S5 is less than the threshold value ΔPc, and also detects that a value ΔPs6 obtained by subtracting the minimum interval average Pmin from the minimum value P6min for the interval S6 is less than the threshold value ΔPc. Furthermore, the controller 10 detects that a value ΔPs7 obtained by subtracting the minimum interval average Pmin from the minimum value P7min for the interval S7 is greater than the threshold value ΔPc, and at this time, halts the pump 7. The pump 7 is not halted in the interval S5, at which the fluctuation tendency of the pressure in the fluid receptacle 5 has changed from the tendency to reduce to the tendency to increase, because a waiting period for a margin is to be obtained to completely remove the coffee liquid from the brewing chamber 4. It should be noted that, as illustrated in FIG. 4, there is a time lag since the rotation of the pump 7 in the direction R was halted until the delivering of the coffee liquid into the cup C is actually halted.

As described above, a predetermined quantity of ground coffee and the first quantity of hot water are supplied to the brewing chamber 4, and then, the second quantity of hot water is supplied to the brewing chamber 4 during delivering of the coffee liquid by the pump 7, so that without interruption, the volume of the beverage corresponding to the capacity of a cup is delivered to, and served in the cup C.

According to the arrangement of the beverage dispenser 1 of this embodiment, the pressure in the fluid receptacle 5 is reduced by the pump 7, and a beverage that has been brewed in the brewing chamber 4 is filtered by the filter F and is received in the fluid receptacle 5, and thereafter, is drawn by suction along the beverage path L2 and delivered to the cup C. Furthermore, after a predetermined quantity of a raw material and the first quantity of water have been supplied to the brewing chamber 4, the beverage in the brewing chamber 4 is delivered to the cup C by the pump 7 through the filter F and the fluid receptacle 5 along the beverage path L2, and during delivering of the beverage, the second quantity of water is supplied to the brewing chamber 4, so that without interruption, the quantity of the beverage corresponding to the capacity of the cup is delivered to, and served in the cup C.

As described above, since the negative-pressure suction method for reducing the pressure in the fluid receptacle 5 to deliver the beverage to the cup C is employed for the arrangement, the brewing chamber 4 need not be closed, and therefore, at any time during delivering of the beverage to a cup C, hot water can be supplied to the brewing chamber 4 through the upper opening of the brewing chamber 4. Thus, even when, for example, the internal volume of the brewing chamber 4 is maintained to cope with the quantity of the beverage to be served in the standard sized cup, and when serving of a large volume of a beverage is to be performed in accordance with user's selection, the quantity of water to compensate for the insufficiency can be supplied during brewing of the beverage, and a large volume of the beverage can be served. Furthermore, for example, since the quantity of a raw material appropriate for brewing a large volume of a beverage and the first quantity of water appropriate for brewing a regular volume of a beverage are supplied to the brewing chamber, and thereafter, the second quantity of water to compensate for the insufficiency is supplied to the brewing chamber 4 during the delivering of the beverage to the cup C by the pump 7, the volume of a beverage corresponding to the capacity of the large sized cup is delivered to, and served in the cup C without interruption. Therefore, the presence of the waiting period in which delivering of the beverage is not performed can be avoided, and accordingly, a large volume of the beverage can be supplied in a short period of time. Furthermore, since interruption of delivering the beverage to the cup can be prevented during serving of a large volume of a beverage, a user will not pull a cup out before serving of the beverage is completed, and a large volume of beverage can be appropriately served.

Thus, the beverage dispenser capable of supplying a large volume of a beverage while the compact brewing chamber size is maintained, and capable of appropriately performing serving of a large volume of beverage within a short period of time, can be provided.

Moreover, according to the arrangement in this embodiment, after a predetermined quantity of a raw material and the first quantity of water have been supplied to the brewing chamber 4, mixing of the raw material and water is performed by the pump 7 that is a tube pump, and when the predetermined time period T2 has elapsed since the mixing operation was halted, the suction delivering of the beverage by the pump 7 is started.

Therefore, the waiting period can be provided in which, after the operation of the pump 7 is halted, the raw material that is floating in the fluid mixture in the brewing chamber 4 by the mixing operation of the pump 7 can be appropriately settled down on the filter F side. Therefore, a phenomenon that hot water passes the filter F without contacting the raw material can be properly prevented. Therefore, the raw material can appropriately contact the hot water, and can be employed without waste to contribute to efficient brewing.

Furthermore, for the arrangement in this embodiment, supplying of the second quantity of water is started after the predetermined time period T3, determined based on the flow rate Q1 to supply hot water and the flow rate Q2 to draw in the beverage by the pump 7, has elapsed since the suction delivering of the beverage was started by the pump 7.

As a result, supply of the quantity (second quantity) of hot water to the brewing chamber 4 to compensate for the insufficiency can be started at an appropriate timing, and even when a small internal volume of the brewing chamber 4 is maintained, hot water can be supplied to the brewing chamber 4, without overflowing the brewing chamber 4.

Furthermore, in the arrangement of this embodiment, the pressure sensor 8 is prepared, and the controller 10 sequentially determines, for individual intervals of the preset time length Δt, the interval average for the measured pressure P obtained by the pressure sensor 8, and in a case in which the interval average for an interval Sn at a predetermined position is greater than the interval average for the preceding interval Sn-1 that is earlier than and adjacent to the interval Sn, the controller 10 regards the interval average for the preceding interval Sn-1 as the minimum interval average Pmin, and halts the pump 7 when the interval averages for a predetermined number of intervals (including the interval Sn) that follow the preceding interval Sn-1 are greater than a value obtained by adding the preset threshold value ΔPc to the minimum interval average Pmin.

With this arrangement, in a case in which a tube pump is employed as the pump 7 and in which rapid pulsation is exhibited for the pressure in the fluid receptacle 5, it can be accurately detected that the tendency to reduce the pressure in the fluid receptacle 5 has changed to the tendency to increase, and a waiting period can be obtained after the fluctuation tendency of the pressure has changed to the tendency to increase and before the pump 7 will be halted. As a result, when the coffee liquid in the brewing chamber 4 has been completely drawn by suction, the pump 7 can be halted, and the operation can be smoothly shifted to the succeeding control operation, such as the above described standby control for shifting the fluid receptacle 5 to the lower position.

Moreover, in the arrangement for this embodiment, when the preset time period T4 has elapsed since the suction delivering of the coffee liquid was started by the pump 7, the control for halting the pump 7 is started.

Thus, even in a case in which, immediately after the suction delivering operation is started, an unstable period is present in which the pressure in the fluid receptacle 5 goes beyond the atmospheric pressure P0, the disregard time period in which the measurement signal transmitted by the pressure sensor 8 is disregarded is prepared after the suction delivering operation of the pump 7 has begun. Therefore, during this period, the pump 7 can be forcibly driven.

Furthermore, in the arrangement of this embodiment, the buffer unit 9 is arranged at the end of the beverage path L2 close to the cup C.

Therefore, the coffee liquid descends, while spirally turning, along the inner wall of the large-diameter portion 9a of the buffer unit 9, i.e., the coffee liquid is settled in the buffer unit 9 while whirling, and thereafter, is delivered from the delivery port of the small-diameter portion 9b into the cup C. Therefore, even when there is pressure pulsation caused by the pump 7 that is a tube pump, the pressure of the beverage received in the buffer unit 9 can be averaged to deliver the beverage. As a result, when the coffee liquid is to be poured into the cup C, it is possible to prevent the occurrence of a problem that splashes of the beverage adhere to the upper side of the cup C because of ripples on the liquid surface caused by the pressure pulsation, or that air bubbles are included in the beverage by entrapping the air.

The preferred embodiment of the present invention has been described; however, the present invention is not limited to this embodiment, and can be variously modified and altered based on the technical idea of the present invention. Several example modifications of the invention will be provided below.

For example, in a case as illustrated in FIG. 3, in which a time period required for supplying a predetermined quantity of ground coffee, which is necessary for a case in which the volume of a coffee liquid for a large sized cup is to be served, is longer than a time period required for supplying the first quantity of water, the supply of hot water to the brewing chamber 4 is completed earlier than the supply of ground coffee, and only the ground coffee is thereafter supplied to the brewing chamber 4. As a result, there is a case in which the ground coffee is attached to the inner wall of the receiving chamber 4a of the brewing chamber 4, and does not contribute to serving of the beverage.

Figure 8:
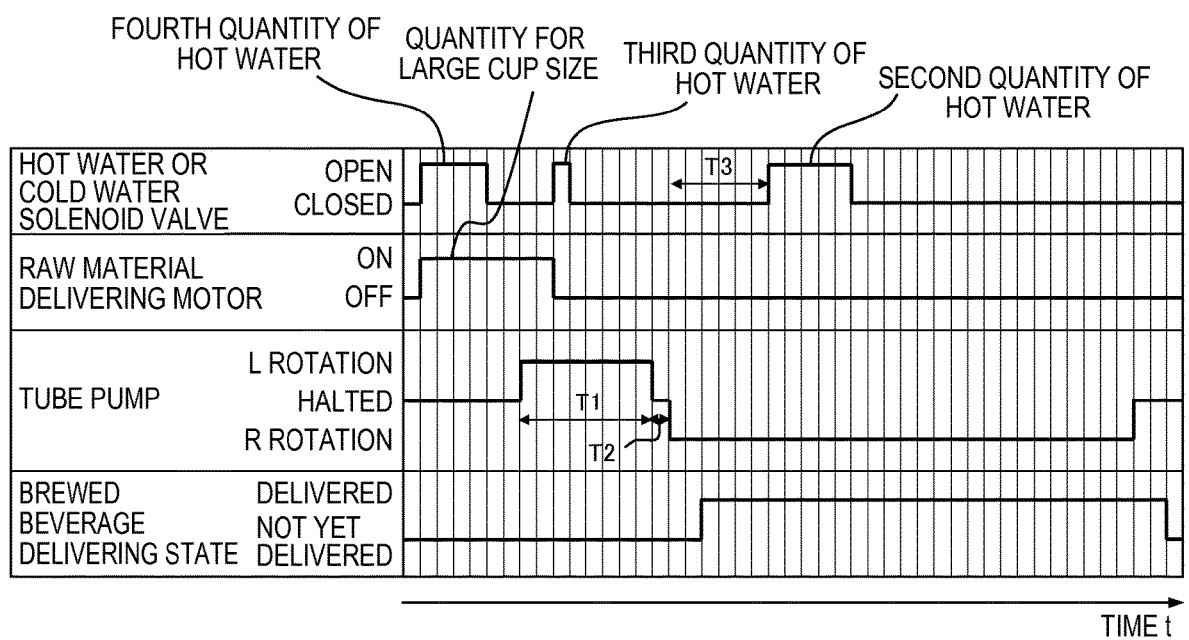
FIG. 8 is a timing chart for a modification of the beverage dispenser according to the embodiment.

In the above described case in which it is assumed that a time period required for supplying a predetermined quantity of ground coffee will be longer than a time period required for supplying the first quantity of water, as illustrated in the arrangement in FIG. 8, a third quantity of water may be supplied to the brewing chamber 4 after the ground coffee has been supplied and before the second quantity of water will be supplied. In this case, as illustrated in FIG. 8, the quantity obtained by subtracting the third quantity from the first quantity is regarded as a fourth quantity, and first, the fourth quantity of hot water is supplied to the brewing chamber 4, and when supplying of ground coffee is completed, supply of the third quantity of hot water is started. As a result, even when the ground coffee is attached to the inner wall of the receiving chamber 4a, the attached ground coffee can be washed down to the mixing chamber 4b with the third quantity of hot water, and can contribute to brewing of the beverage. It should be noted that, also in this case, the total of the third quantity and the fourth quantity corresponds to the first quantity in this embodiment, and therefore, the quantity of the coffee liquid appropriate for a large sized cup can be provided by supplying the second quantity, the third quantity and the fourth quantity of hot water.

Furthermore, this embodiment has been explained by assuming that the second quantity of hot water is supplied to the brewing chamber 4 at once; however, the way of supplying hot water is not limited to this, and hot water may be supplied to the brewing chamber 4 by multiple times so as to provide the second quantity of hot water in total. It should be noted that the beverage brewing efficiency for the unit quantity of the raw material is increased when the time period in which the raw material contacts the hot water is extended, and therefore, supply of the second quantity of hot water at once is more appropriate in order to improve the beverage brewing efficiency.

Furthermore, in the embodiment, the interval average for the pressure P measured by the pressure sensor 8 is regarded as the minimum value of multiple values for the measured pressure P obtained in one interval; however, the interval average is not limited to this value, and may also be regarded as, for example, the mean for multiple values for the measured pressure P obtained in one interval. When a graph in FIG. 9 representing the same range as that illustrated in FIG. 7 is employed as an example for the explanation, the means for individual intervals S1 to S8 are P1ave to P8ave, and the controller 10 employs these means to control halting of the pump 7.

In the description for FIG. 9 and FIG. 7, the filtering process is performed for raw data of the measurement signal indicating the measured pressure P, and the measurement signal P obtained by the filtering process is transmitted to the controller 10 as a measurement signal of the measured pressure P transmitted from the pressure sensor 8. However, the present invention is not limited to this operation. For example, in a case in which there are comparatively only a few sharp changes due to noise, etc., the raw data for the measurement signal may be transmitted to the controller 10, and as explained for FIG. 7, the minimum value for each interval of the raw data may be regarded as the interval average, or as explained for FIG. 9, the mean of raw data for each interval may be regarded as the interval average value.

Furthermore, in a case in which only hot water is supplied to the brewing chamber 4 because a raw material has run out, or because a failure has occurred to supply the raw material from the raw material supply unit 2 to the brewing chamber 4, or in a case in which dregs of the raw material are caught between the lower end of the brewing chamber 4 and the filter F, or between the upper end of the fluid receptacle 5 and the filter F, there is a possibility that, even when the pump 7 starts the suction delivering operation, negative pressure of a sufficiently large magnitude cannot be generated in the fluid receptacle 5. In this case, even after the fluctuation tendency of pressure in the fluid receptacle 5 has changed from the tendency to reduce to the tendency to increase, a difference between the interval average for the succeeding interval and the minimum interval average Pmin does not go beyond the threshold value ΔPc, the pump 7 might not be halted based on the measurement signal of the pressure sensor 8.

In the above described case in which it is assumed that the pump 7 cannot be appropriately halted merely by controlling halting of the pump based on the measurement signal from the pressure sensor 8, the interval average for the measured pressure P obtained by the pressure sensor 8 may be sequentially determined, for example, for the individual intervals of the preset time length Δt, and in a case in which the interval average of an interval Sn at a predetermined position is greater than the interval average for the preceding interval Sn-1 that is earlier than and adjacent to the interval Sn, the interval average for the preceding interval Sn-1 may be regarded as the minimum interval average Pmin, and the pump 7 may be halted at the time earlier of the two, i.e., either the time at which the interval averages for a predetermined number of intervals (including the interval Sn) that follow the preceding interval Sn-1 are greater than a value obtained by adding a preset threshold value ΔPc to the minimum interval average Pmin, or the time at which the predetermined time period (time-up period) has elapsed that is determined based on the flow rate Q1 for drawing in the beverage by the pump 7 and the volume of the beverage to be served in the cup C.

When both the pump halt control based on the measurement signal of the pressure sensor 8 and the pump halt control in accordance with the time-up period are performed in this manner, the pump 7 can be appropriately halted even in a case in which a sufficient negative pressure is not generated in the fluid receptacle 5.

The beverage dispenser has been described by employing a case in which a coffee liquid is to be served; however, a beverage to be served is not limited to coffee, and, for example, green tea can also be served. In this case, tea leaves are supplied as a raw material to the brewing chamber 4. Furthermore, the beverage is not limited to coffee or tea drink, and so long as a beverage can be produced by brewing, any type of beverage can be employed. Furthermore, hot water has been supplied to the brewing chamber 4; however, water is not limited to hot water, and cold water may be supplied. The beverage can be produced in the same manner by supplying cold water.

Furthermore, the beverage dispenser 1 has been described by being incorporated in a server that serves the beverage in a cup. However, the beverage dispenser is not limited to this type, and may be incorporated in a cup-serving automatic vending machine.

As described above, according to the configuration of the beverage dispenser proposed in the present invention, the pump reduces the pressure in the fluid receptacle that is arranged, through the filter, at the lower end of the cylindrical brewing chamber, and the beverage that has been brewed in the brewing chamber is filtered by the filter and is received in the fluid receptacle, and the obtained beverage is drawn, by suction, through the beverage path and is delivered to the cup. Furthermore, after the predetermined quantity of the raw material and the first quantity of water have been supplied to the brewing chamber, the beverage in the brewing chamber is delivered to the cup by the pump, and during the delivering of the beverage, the second quantity of water is supplied to the brewing chamber, so that without interruption, the quantity of the beverage corresponding to the cup capacity is delivered to and served in the cup.

According to this arrangement, since delivering of the beverage to the cup is performed by the negative-pressure suction method for reducing the pressure in the fluid receptacle that is arranged through the filter at the lower end of the brewing chamber, the brewing chamber need not be closed, and therefore, during delivering of the beverage to the cup, water can be supplied to the cylindrical brewing chamber through the upper opening of the brewing chamber. Thus, even when the internal volume of the brewing chamber is maintained to cope with the volume of the beverage (regular volume) for single standard-sized cup serving, and when serving of a large volume of a beverage is to be performed by user's selection, the quantity of water to compensate for the insufficiency can be supplied to serve a large volume of a beverage during brewing of the beverage. Furthermore, since the quantity of the raw mater appropriate for brewing of a large volume of a beverage and the first quantity of water appropriate for brewing a regular volume of a beverage are supplied to the cylindrical brewing chamber, and thereafter, during the delivering of the beverage to the cup by the pump, the second quantity of water equivalent to the insufficient quantity is supplied to the brewing chamber, the quantity of the beverage corresponding to the capacity of a large sized cup is delivered to, and served in the cup without interruption. Therefore, the occurrence of the waiting period where delivering of the beverage is not performed can be prevented, and accordingly, a large volume of a beverage can be supplied within a short period of time. Furthermore, since interruption of delivering of the beverage to the cup can be prevented during serving of a large volume of the beverage, a user will not pull the cup out before the serving of the beverage is completed, and serving of a large volume of a beverage can be appropriately performed.

As described above, the beverage dispenser capable of supplying a large volume of a beverage while maintaining the compact brewing chamber size, and capable of appropriately performing serving of a large volume of a beverage within a short period of time, can be provided.

In the above explanation, the beverage dispenser 1 employs, as the basic arrangement, the arrangement in which a predetermined quantity of the raw material and the first quantity of water are supplied to the brewing chamber 4, and during delivering of the beverage by the pump 7, the second quantity of water is supplied to the brewing chamber 4, so that without interruption, the quantity of the beverage corresponding to the cup capacity is delivered to, and served in the cup C. However, in a case in which, as the main object, for example, it can be accurately detected that the fluctuation tendency for pressure in the fluid receptacle 5 has changed from the tendency to reduce to the tendency to increase, and the pump 7 is to be halted when the coffee liquid in the brewing chamber 4 is completely drawn by suction, the basic arrangement need not be included. The configurations of a reference invention (reference configurations 1 to 5) to achieve this object will be described below.

Reference Configuration 1

A beverage dispenser, in which a filter is arranged between a lower end of a cylindrical brewing chamber and an upper end of a fluid receptacle, and a beverage that has been brewed by supplying a raw material and water to the brewing chamber and has been filtered by the filter is received in the fluid receptacle, and is thereafter delivered to a cup along a beverage path, comprising:

a pump arranged partway along the beverage path, and that reduces a pressure in the fluid receptacle to draw the beverage from the brewing chamber by suction, and delivers the beverage to the cup;

a pressure sensor that measures the pressure in the fluid receptacle; and a controller that sequentially determines, for individual intervals of a preset time length, an interval average for measured pressure obtained by the pressure sensor, regards as the minimum interval average the interval average for a preceding interval that is earlier than and adjacent to a specific interval, in a case in which the interval average of the specific interval is greater than the interval average of the preceding interval, and halts the pump in a case in which the interval average for an interval that follows the preceding interval is greater than a value obtained by adding a preset threshold value to the minimum interval average.

Reference Configuration 2

A beverage dispenser, in which a filter is arranged between a lower end of a cylindrical brewing chamber and an upper end of a fluid receptacle, and a beverage that has been brewed by supplying a raw material and water to the brewing chamber and has been filtered by the filter is received in the fluid receptacle, and is thereafter delivered to a cup along a beverage path, comprising:

a pump arranged partway along the beverage path, and that reduces a pressure in the fluid receptacle to draw the beverage from the brewing chamber by suction, and delivers the beverage to the cup;

a pressure sensor that measures the pressure in the fluid receptacle; and a controller that sequentially determines, for individual intervals of a preset time length, an interval average for measured pressure obtained by the pressure sensor, regards as the minimum interval average the interval average for a preceding interval that is earlier than and adjacent to a specific interval in a case in which the interval average of the specific interval is greater than the interval average of the preceding interval, and halts the pump at the time earlier of two, i.e., either the time at which the interval average for an interval that follows the preceding interval is greater than a value obtained by adding a preset threshold value to the minimum interval average, or the time at which a predetermined period has elapsed that is determined based on a flow rate for drawing in a beverage by the pump and the quantity of the beverage to be served in the cup.

Reference Configuration 3

The beverage dispenser according to reference configuration 1 or 2, wherein the interval average is the minimum value of a plurality of values for the measured pressure obtained in the specific interval.

Reference Configuration 4

The beverage dispenser according to reference configuration 1 or 2, wherein the interval average is the mean of a plurality of values for the measured pressure obtained in the specific interval.

Reference Configuration 5

The beverage dispenser according to any one of reference configurations 1 to 4, wherein the controller starts the control for halting the pump when a preset period of time has elapsed from the start of suction delivering of the beverage by the pump.

The operational effects obtained by the reference invention that employs the individual reference configurations have been described in detail for the embodiment and modifications thereof.

What is claimed is:

1. A beverage dispenser that selectively brews, using a beverage raw material and water, a first volume of a beverage that corresponds to a capacity of a first cup or a second volume of the beverage that corresponds to a capacity of a second cup, which is greater than the capacity of the first cup, and serves the brewed beverage in a selected one of the first cup and the second cup, the beverage dispenser comprising:

a brewing chamber that brews the beverage, the brewing chamber having a cylindrical shape, and having an upper opening and a lower opening;

a raw material supply that supplies the beverage raw material to the brewing chamber;

a water supply that supplies water to the brewing chamber, the water supply having:
- a tank storing the water,
- a water supply path, of which a first end of the water supply path is connected to the tank and a second end of the water supply path extends to the upper opening of the brewing chamber, and
- a solenoid valve arranged in the water supply path, said solenoid valve opening the water supply path in an open state of the solenoid valve and closing the water path in a closed state of the solenoid valve;

a fluid receptacle arranged at a bottom of the brewing chamber, and receiving, through a filter, the beverage brewed by the brewing chamber;

a beverage path, a first end of the beverage path being connected to the fluid receptacle and a second end of the beverage path extending to the selected one of the first cup and the second cup to introduce the beverage into the selected one of the first cup and the second cup;

a pump arranged partway along the beverage path, the pump performing a suction delivering operation to draw the beverage from the brewing chamber by reducing the pressure in the fluid receptacle so as to deliver the beverage to the selected one of the first cup and the second cup; and a controller that controls operation of at least the raw material supply, the solenoid valve, and the pump, wherein:

a cup size is selected from between the first cup for the first volume of the beverage and the second cup for the second volume of the beverage, and the controller receives an identification signal of the selected one of the first cup and the second cup, the controller is configured to set: (a) a first period of time required for the water supply to supply a first quantity of water necessary to brew the first volume of the beverage that corresponds to the capacity of the first cup, (b) a second period of time required for the raw material supply to supply a predetermined quantity of the raw material necessary to brew the second volume of the beverage that corresponds to the capacity of the second cup, and (c) a third period of time required for the water supply to supply a second quantity of water which is a quantity to compensate for a difference between the first volume of the beverage and the second volume of the beverage, the amount of the second quantity of water being obtained by subtracting the first quantity from a quantity of water necessary to brew the second volume of the beverage, and in a case in which the controller receives the identification signal indicating selection of the second cup:
- the solenoid valve is opened by the controller, and when the first period of time has elapsed since the solenoid valve is opened, the solenoid valve is closed,
- the raw material supply is activated by the controller,
- when the second period of time has elapsed after the raw material supply is activated, the raw material supply is stopped,
- the pump is activated by the controller when a first preset time period has elapsed since the solenoid valve is closed, to start the suction delivering operation, and
- the solenoid valve is re-opened by the controller during the suction delivering operation of the pump and when a second preset time period has elapsed since the start of the suction delivering operation, and the solenoid valve is closed when the third period of time has elapsed since the re-opening of the solenoid valve.

* * * * *